(12) United States Patent
McBride

(10) Patent No.: US 6,389,119 B1
(45) Date of Patent: May 14, 2002

(54) DUAL-CIRCUIT TELEPHONY

(75) Inventor: Richard McBride, Aberdour (GB)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/276,522

(22) Filed: Mar. 25, 1999

(30) Foreign Application Priority Data

Mar. 27, 1998  (DE) ............................................. 9806595

(51) Int. Cl.[7] ............................................. H04M 11/00
(52) U.S. Cl. ..................... 379/93.01; 379/900; 370/352
(58) Field of Search ............... 379/990, 93.01, 379/93.09; 370/353, 380, 389, 392, 396, 401, 404, 427, 435, 450, 465

(56) References Cited

U.S. PATENT DOCUMENTS

| | | | | |
|---|---|---|---|---|
| 6,011,794 A | * | 1/2000 | Mordowitz et al. | 370/352 X |
| 6,064,653 A | * | 5/2000 | Farris | 370/352 X |
| 6,122,255 A | * | 9/2000 | Bartholomew et al. | 370/352 X |
| 6,125,113 A | * | 9/2000 | Farris et al. | 370/352 X |
| 6,154,445 A | * | 11/2000 | Farris et al. | 379/221 X |

FOREIGN PATENT DOCUMENTS

WO          WO 98/05145          2/1998

* cited by examiner

Primary Examiner—Creighton Smith
(74) Attorney, Agent, or Firm—Nixon & Vanderhye PC

(57) ABSTRACT

A telephone instrument comprises a mechanism for providing signals for transmission, a mechanism for converting signals received by the instrument into output signals, a switching circuit for selectively establishing and terminating a connection between the instrument and a circuit-switched telephone network and for selectively establishing and terminating a connection between the instrument and a packet-switched communication network. When calling, the instrument signals over the circuit-switched network for a network address for the called instrument and the packet-switched network and establishes a dual connection over the packet-switched network if such a network address is received. When receiving a call, the instrument can terminate the call connection over the circuit-switched network and continue the call by way of the packet-switched network.

4 Claims, 3 Drawing Sheets

DUAL-CIRCUIT TELEPHONY

FIELD OF THE INVENTION

The present invention relates to telephony and to telephone instruments which have dual circuit capability.

BACKGROUND TO THE INVENTION

Most telephone networks in use at the present time are circuit switched networks, in which telephone subscribers have, at least to a local switching station, a dedicated line identified by a subscriber's number. Connection to the network is achieved by a switch closing a circuit including the subscriber line to the local switching station. Telephone calls may be conveyed from switching station to switching station by a variety of links, but connection is established for the call to the ultimate recipient by means of circuit switching controlled by the generation of pulse trains or tones representing the recipient's telephone number. Although telephone messages, whether voice calls or other types of call, such as facsimile transmissions, may be conveyed between switching stations by various time division, frequency division or even packet-switched communication links, as far as the end stations, the telephone instruments, are concerned they make connections to an analog circuit-switched network. Owing to the global nature of the existing circuit-switched networks, their use will obviously continue for many years and telephone instruments are necessarily adapted to establish connections by way of the familiar circuit-switched network.

In recent years there has been increasing use, first in local area networks and then on a wider scale, of packet-switched networks, of which the 'Internet' is the best known. The present invention is based on an appreciation that the usage of packet-switched networks will provide a potential alternative communication link between telephone subscribers.

The present invention envisages a new form of telephone instrument, typically a handset capable of making voice calls, which has a dual circuit capability in that it is capable of establishing a call connection over the ordinary, circuit-switched telephone network but may, if desired automatically, transfer the call connection from the circuit-switched telephone network to a packet-switched network.

SUMMARY OF THE INVENTION

An instrument according to the invention would normally possess, in common with existing instruments, some means for providing signals for transmission and some means for converting signals received by the instrument into output signals. The aforementioned means may, in the case of a telephone handset instrument, include the usual microphone and loudspeaker and the usual dialing equipment or tone generation equipment by means of which an intended recipient's number can be transmitted in the format required by the circuit-switched network to the local switching station in order to establish a call connection with an intended recipient.

An instrument according to the invention will, however, further comprise not only a switching circuit for selectively establishing and terminating a connection between the instrument and the circuit-switched telephone network but further means for selectively establishing and terminating a connection between the instrument and a packet-switched communication network. The switching circuit for this purpose may include appropriate multiplexing equipment interposed between the call generating and receiving circuits and the terminals or connection points for the telephone network and the packet-switched network.

Further, the telephone instrument preferably comprises control means including means operable to define or obtain a network address of the instrument in the packet-switched communication network, the control means being operable:

(i) to control the switching circuit to establish a call connection to another instrument on the telephone network;

(ii) in response to receipt of an acknowledgement signal including the network address of the other instrument to control the switching circuit to make the call connection to the other instrument by way of the packet-switched network.

The instrument may signal information including its network address over the initial call connection. Alternatively, it may obtain its network address only after receipt of the said acknowledgment from the other instrument.

The instrument may further comprise control means operable on receipt of a call by way of the circuit-switched network to provide an acknowledgement including the network address of the instrument, and on receipt of a subsequent message over the packet-switched network to terminate connection over the circuit-switched network.

DETAILED DESCRIPTION

Figure 1:
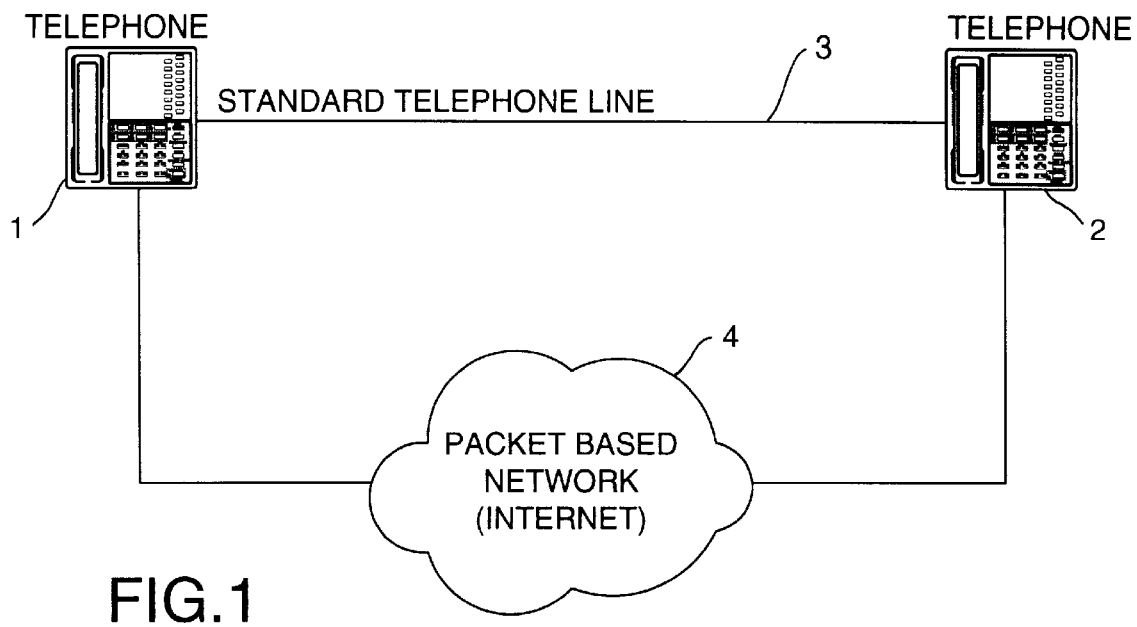
FIG. 1 is a schematic illustration of two telephones having dual connections.

FIG. 1 illustrates broadly the intended operation of the invention, which assumes the continued existence of the familiar circuit-switched networks. When therefore a calling instrument (hereinafter called 'station') needs to communicate with a second instrument (station) 2, station 1 will initially use a circuit-switched line 3, since there is a presumption that at least in the foreseeable future the remote station 2 will be connected to the public-switched telephone network. If however the called station 2 is connected to a packet-switched network 4 and the calling station 1 is also connected to the packet-switched network, then the call may be completed over the packet-switched network.

Whether a call should be completed over the packet-switched network 4 may be a matter of selection and programming and may also be dependent upon whether the cost of a call per unit time is cheaper or more expensive over the packet-switched network 4 than it is over the ordinary telephone line 3 which proceeds through the public-switched telephone network. It will be assumed in the following that at least the calling instrument or station 1 is configured or programmed to attempt to establish a packet-switched call connection with the remote station 2 if it is feasible to do so.

Figure 2:
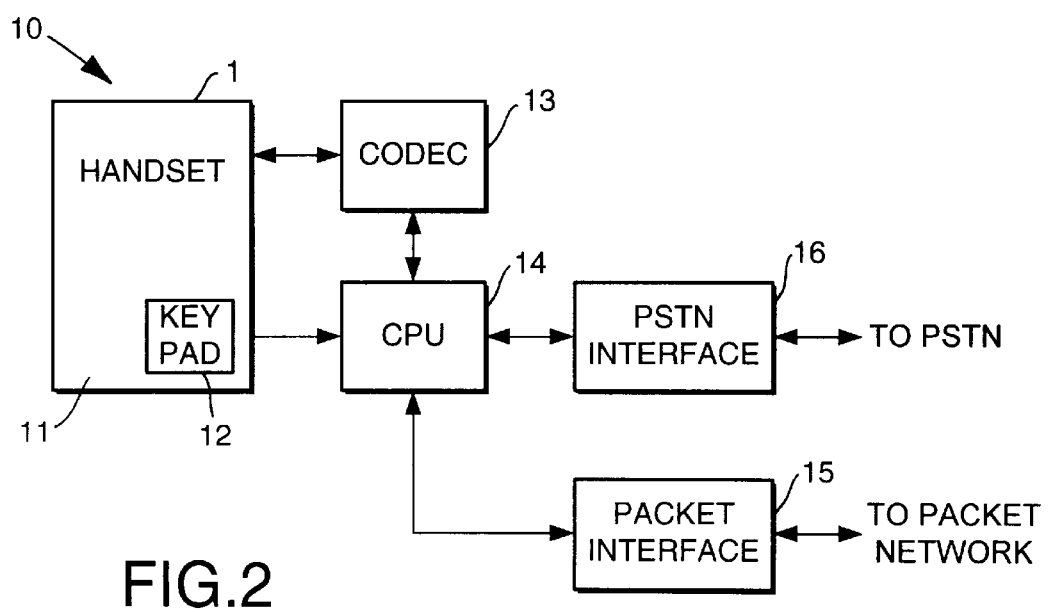
FIG. 2 is a schematic drawing of a telephone according to the invention coupled to both a public-switched telephone network and a packet-based network.

FIG. 2 illustrates a calling station 10 which includes a telephone instrument 1 comprising a familiar handset 11 and a keypad 12. The instrument 1 is connected to a voice codec 13 which takes analog signals from the handset, digitizes them and passes the digitized data to a central processing unit (CPU) 14. The CPU may be of the digital signal processor type. It is employed to process signals both from the handset 1 via the voice codec 13 and also a packet interface 15 and to couple signals from a PSTN interface 16. The packet interface may be any one of a variety of packet interfaces, such as an ASDL interface or an Ethernet interface. The packet interface, in this example, transmits Ethernet packets in which the message data is constituted by voice data obtained by way of the voice codec 13 and CPU 14 from the instrument 1.

Figure 3:
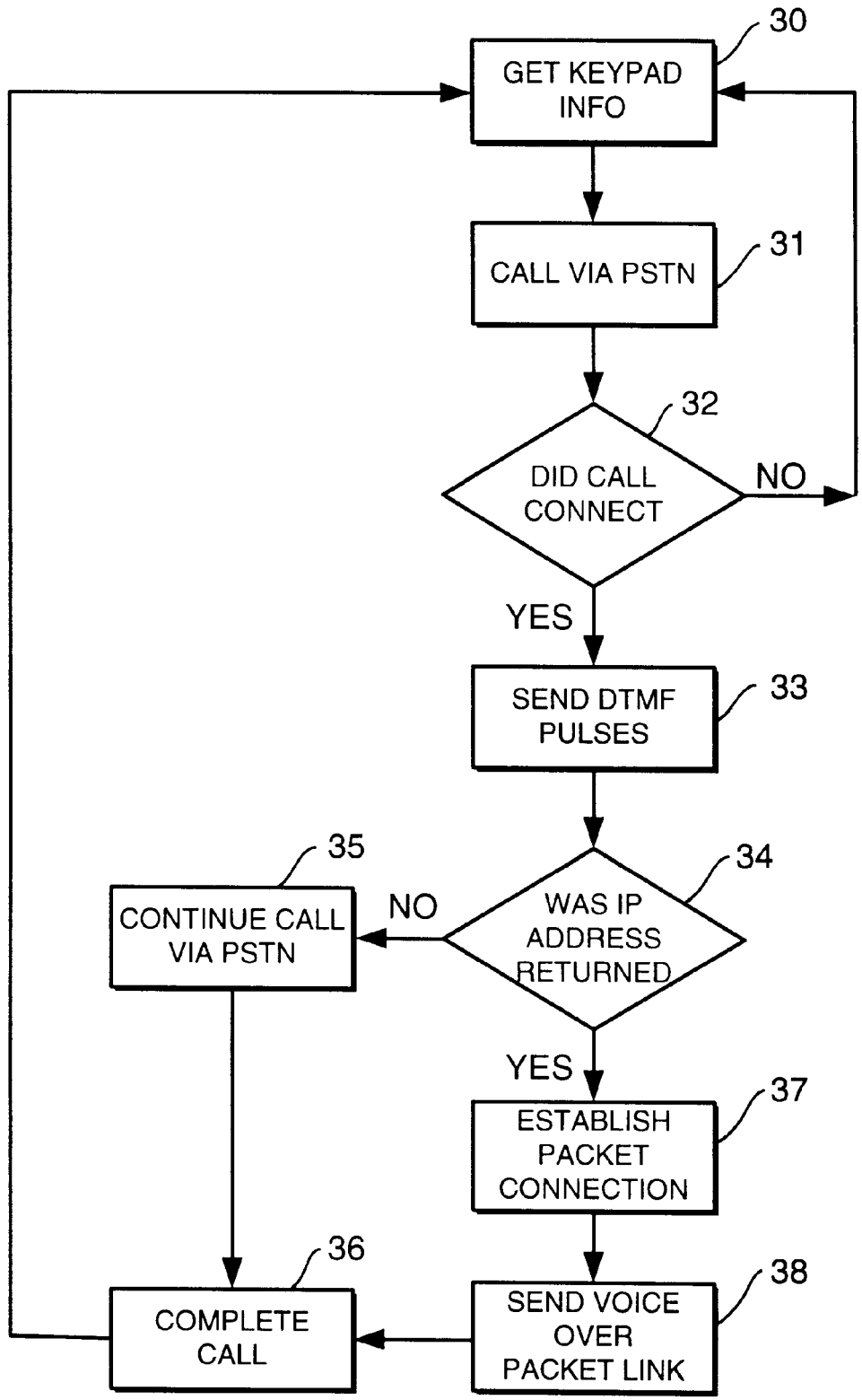
FIG. 3 illustrates the operation of call logic at a calling station.
Figure 4:
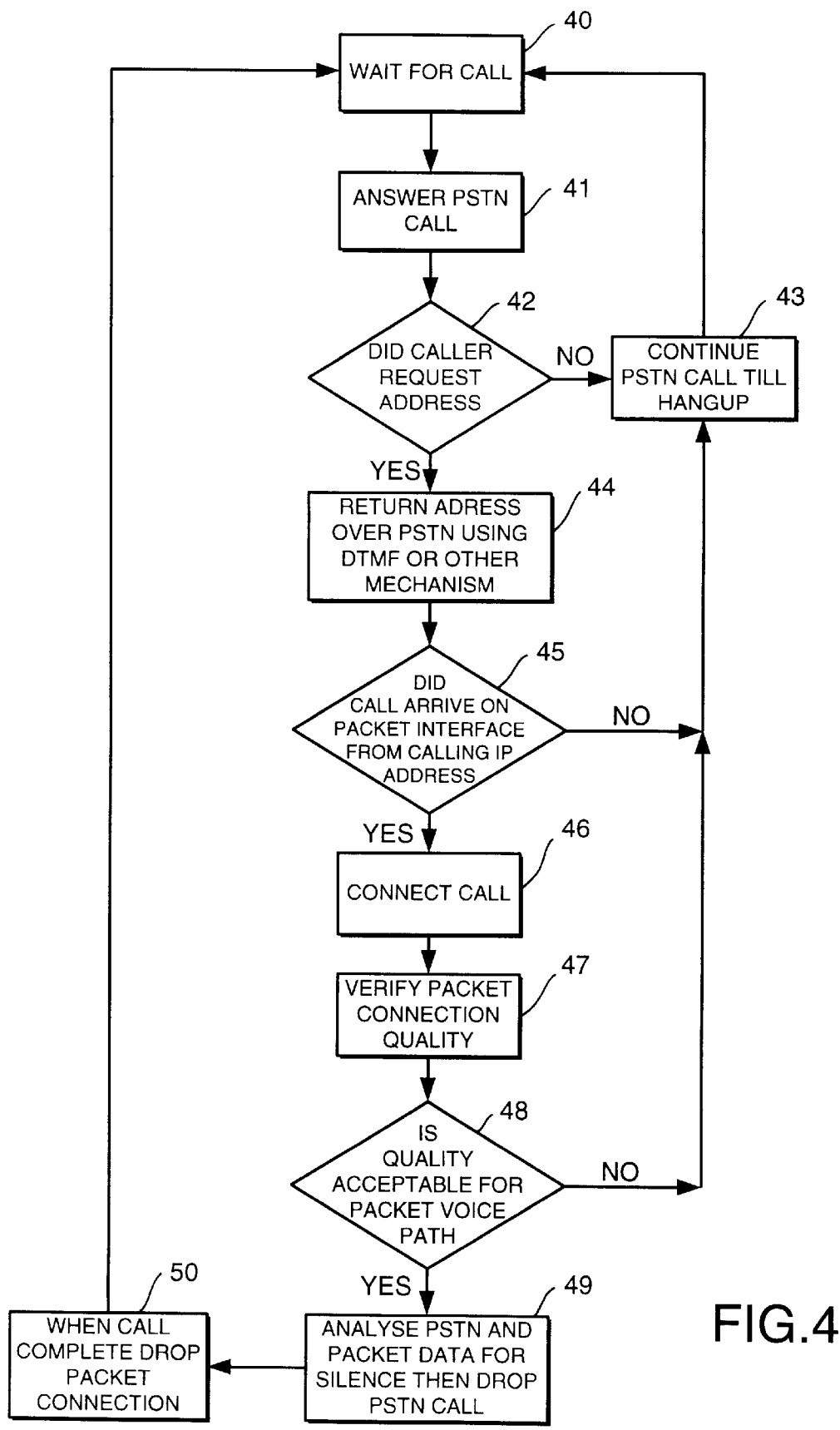
FIG. 4 illustrates the operation of call logic at a called or receiving station.

FIGS. 3 and 4 illustrate the operation of a station 10 when operating as a calling station and a called or receiving station respectively.

In the system broadly shown in FIG. 1, and on the assumption that at least telephone 1 is disposed in a station 10 having a facility for communicating by way of the packet-switched network 4, the operation is as follows.

User A at station 10 including instrument 1 calls a user B, having telephone 2 by means of obtaining the keypad information entered by the keypad 12 and calling via the public-switched telephone network, as shown at stages 30 and 31 of FIG. 3. If the call did not connect (stage 32), a fresh attempt is made to initiate the call (stage 30). In any case, the CPU will collect the digits from the keypad and signal them down the PSTN interface 16 to the public-switched telephone network.

Once a circuit has been established by way of the public-switched network, users A and B will be able to talk over the circuit as in a standard telephone call. Once the call is established, the originating station will attempt to signal the receiving station to establish whether the receiving station has a packet-switched network that could be used for continuing the call. A basic signaling method that will work on all types of public-switched telephone networks is in-band with the voice signal. One method is to employ DTMF signals to send information from A to B, namely a sequence of tones along with the user's voice data which indicates to the receiving station that the sending station 10 is equipped with a secondary packet interface 14. This is shown by stage 33 in FIG. 3.

If the receiving station is not equipped with the logic to respond to the DTMF tones, the sending station will continue to communicate over the PSTN network, as shown by stages 35 until the call is completed (stage 36). If however the receiving station is equipped with the appropriate logic, it can respond to the sending station by indicating the network address on the packet network (stage 34). This address might be fixed and unchanging or might be assigned dynamically in some way. One known method to assign addresses dynamically is to have the station communicate to a centralized entity that will use a protocol to communicate to calling station a free address. This communication of the address (however allotted) of the receiving station B is communicated over the packet-switched network to the packet interface 15 and the CPU 14. This is shown by stage 34 in FIG. 3.

Once the called station has responded to the calling station with its packet network address the calling station can attempt to obtain a connection over the packet network. Using the packet network address obtained from the called station, the calling station will attempt to connect over the packet network. If the calling station can establish a connection then digitized voice data may be sent from instrument 1 by voice codec 13 and CPU 14 over the packet network. Optionally, the called station can verify the quality of the packet link to see whether it is adequate for both voice calls. The quality check may determine latency, jitter, reliability or some other attribute of the link.

Thus as shown in FIG. 3, there is establishment of the packet connection at stage 37 and the sending of voice data over the packet link (stage 38) until the call is completed.

With two links established, one over the circuit-switched network and one over the packet-based network, the called station can decide which route to choose. A variety of methods may be used to perform the change over from voice on the public-switched telephone network to voice data on the packet network. For example, the called station may determine when it is appropriate to switch over from the packet-switched telephone network to the packet network. The called station will analyse the voice information arriving on the packet-switched telephone network interface and wait for silence in the voice call. At this point the voice information that is arriving on the packet interface can be sent to the handset without the user being aware of the switch-over. At this point the packet-switched telephone network call can be terminated and the remainder of the call connection can continue over the packet network.

Thus, as shown in FIG. 4, the station 4 logic operates as follows.

Stage 40 indicates the rest state where the station is waiting for a call. Stage 41 indicates the answering of the call over the public-switched telephone network. Stage 42 performed in the CPU 14 requires a determination of whether the caller requested the network address of the station. If no such request was made, the call over the public-switched telephone network is continued until the call is terminated (stage 43).

If the caller requested the network address for the called instrument, the address is returned (stage 44) over the public-switched telephone network using DTMF tones or other mechanism.

If the call arrived on the packet interface from the calling IP address (stage 43) the call is connected over the packet network (stage 46). The connection quality of the packet is verified (stage 47) and there is a further determination to see whether the quality is acceptable for the packet voice path (stage 48). If the call did not arrive from the packet interface from the calling IP address or the voice quality is not acceptable for the packet voice path, the call continues over the public-switched telephone network until hang-up. If however the call did arrive on the packet-based network and the voice quality is acceptable for the packet voice path, the called station analyses the public-switched telephone network and packet data for silence (stage 49) and then terminates the call over the public-switched telephone network by operation of the CPU until the call is complete, when the packet connection is dropped (stage 50).

What is claimed is:

1. A telephone instrument comprising:
   means for providing signals for transmission;
   means for converting said signals received by the instrument into output signals;
   means for selectively establishing and terminating a connection between another telephone instrument by way of a circuit-switched telephone network and for selectively establishing and terminating a connection between the instrument and a packet-switched communication network; and
   control means operable:
   (i) to signal over the circuit-switched network a request to said another instrument for a network address on the packet-switched network;
   (ii) in response to receipt of an acknowledgement signal including a network address for said another instrument to establish a connection to the said other instrument by way of said packet-switched network;

(iii) on receipt of a call by way of the circuit-switched network to provide an acknowledgement including the network address of the instrument.

(iv) on receipt of a consequent message over the packet-switched network to terminate connection to the circuit-switched network and to transfer the call to the packet-switched network connection; and (v) detect temporary silence in the call connection over at least the circuit-switched network before terminating the call connection over the circuit-switched network.

2. A telephone instrument according to claim 1 wherein the control means is operable to test the quality of the call connection over the packet-switched network before terminating the call connection over the circuit-switched network.

3. A method comprising:

providing signals for transmission;

converting said signals received by a telephone instrument into output signals;

selectively establishing and terminating a connection between another telephone instrument by way of a circuit-switched telephone network and selectively establishing and terminating a connection between the instrument and a packet-switched communication network;

signaling over the circuit-switched network a request to said another instrument for a network address on the packet-switched network;

in response to receipt of an acknowledgement signal including a network address for said another instrument, establishing connection to said other instrument by way of said packet-switched network;

on receipt of a call by way of the circuit-switched network, providing an acknowledgement including the network address of the instrument;

on receipt of a consequent message over the packet-switched network, terminating connection to the circuit-switched network and transferring the call to the packet-switched network connection; and detecting temporary silence in the call connection over at least the circuit-switched network before terminating the call connection over the circuit-switched network.

4. A method as in claim 3 further comprising testing the quality of the call connection over the packet-switched network before terminating the call connection over the circuit-switched network.

* * * * *